United States Patent [19]

Serrano et al.

[11] Patent Number: 4,718,080
[45] Date of Patent: Jan. 5, 1988

[54] MICROPROCESSOR CONTROLLED INTERFACE FOR CELLULAR SYSTEM

[76] Inventors: Arthur L. Serrano, 23660 Arminta St.; Andrew W. Holman, 24230 Archwood, both of Canoga Park, Calif. 91304

[21] Appl. No.: 809,222

[22] Filed: Dec. 16, 1985

[51] Int. Cl.⁴ .............................................. H04Q 7/04
[52] U.S. Cl. ......................................... 379/59; 379/63
[58] Field of Search ............... 179/2 E, 2 EA, 2 EB; 379/58–60, 63; 455/33

[56] References Cited

U.S. PATENT DOCUMENTS 4,558,178 12/1985 Yasuda et al. .................... 179/2 E
4,658,096 4/1987 West, Jr. et al. .................... 379/59

OTHER PUBLICATIONS

Lineback, "Cellular Link is Step to Portable Office", *Electronics*, Jun. 28, 1984, pp. 48–50.
"Taking Mobile Out of Cellular" by William L. West, Jr., printed in *Telephone Engineer & Management* (12/15/84), pg. nos. unknown.
"The Cel Tel 5"/Product Literature of Westcom Products, Inc., earliest known distribution Apr. 19, 1985.
"The Cel Tel 1"/Product Literature of Westcom Products, Inc. earliest known distribution Apr. 19, 1985.

*Primary Examiner*—James L. Dwyer
*Assistant Examiner*—Mark E. Ham
*Attorney, Agent, or Firm*—Elliott N. Kramsky

[57] ABSTRACT

A microprocessor-controlled interface for a cellular radio telephone system enables the user to communicate with such system by means of conventional telephony devices. A standard telephone outlet communicates with the transceiver logic bus through a microprocessor. Switches are provided for controlling the audio path between the handset and the transceiver of the mobile, vehicular-mounted unit in response to the status of the interface outlet. The microprocessor interprets both the transceiver bus and various signals generated by the operation of a device that is plugged into the interface so that the operation of the device is rendered fully compatible with the cellular system. The microprocessor is programmed to decode known manufacturer protocols whereby the interface is able to render itself compatible with various equipment types.

13 Claims, 6 Drawing Figures

MICROPROCESSOR CONTROLLED INTERFACE FOR CELLULAR SYSTEM

BACKGROUND

1. Field of the Invention

The present invention relates to apparatus and a method for increasing the utility of a cellular radio communication system. More particularly, this invention pertains to a microprocessor controlled interface that renders numerous useful devices compatible with existing cellular systems.

2. Description of the Prior Art

Mobile telephone communication technology has grown from one way radio transmission, much like that of the Citizens Band (C.B.), to fully-duplexed audio, both voice and data. In large measure, the progress of this technology has followed from the development of low power transmissions that have increased the number of user (and useable) frequencies.

A further development in the area of mobile telephone communication has been that of the cell theory of radio transmission. Cellular systems currently utilize 666 channels assigned by the FCC in an 850 MHz frequency band. Half of such channels are reserved for wire line carriers (local operating companies).

In a cellular system, the service area is divided into a plurality of cells of 8 to 12 miles in radius. The cells may be further subdivided in accordance with the projected amount of system traffic. As the available frequencies are apportioned among an increased number of cells, the required operating power decreases.

Communication by means of a cellular system requires, inter alia radio contact between the mobile vehicular equipment and cell site transmission and receiving equipment. Land line facilities are utilized to tie the vehicular-cell site link into a conventional central switching office whereby the mobile unit is patched into either a non-mobile, "conventional" telephone (or modem) or another mobile telephone so that a full-duplex communication link is established.

The vehicle mounted apparatus of the mobile cellular system commonly comprises a mobile transceiver and a handset. The handset and the transceiver communicate through a logic bus whereby the transceiver is activated to transmit audio entered, as either voice or data, into the handset and to transfer audio and signalling received from the cell site transmission and receiving equipment. In existing mobile systems, the user must become familiar with the particular operational characteristics and requirements of the handset which are differ from that of the standard dial or touch telephone. For example, one must become familiar with a telephone receiver (the handset) that has a peculiar audio "call in" signal that is quite different from the sound of the electromechanical telephone ringer. One must also adjust to a receiver that is totally mute prior to completion of a connection, sounding as if it were a dead line and providing no indication prior to the completion of dialing that the vehicle has entered a "no service" area. The user must become fully conversant with the handset keypad functions, assiduously entering a manual "send" command when initiating a communication. Of further concern, the handset and the transceiver must be "matched" in accordance with the applicable protocol of the manufacturer, further limiting the options of the user.

SUMMARY OF THE INVENTION

The foregoing limitations imposed upon the potential usefulness of existing cellular systems and other disadvantages of the prior art are addressed and overcome by the present invention that provides, in a first aspect, apparatus for interfacing a standard telephone outlet with a cellular system of the type wherein a radio transceiver is adapted to communicate directly with a handset of compatible design so that audio is transmitted between said handset and a central office. Such apparatus includes means for observing the state or the logic bus of the transceiver and for observing the status of the outlet. Means are further provided for generating at least one signal for controlling the outlet in response to the state of the bus and the status of the outlet.

Finally, means including a microprocessor in communication with the logic bus of the transceiver and with the outlet, is provided. Such means is arranged to identify the protocol of the transceiver and to communicate the state of the outlet in the identified protocol to the logic bus.

In a further aspect, the invention provides a method for modifying a cellular system of the type that includes a transceiver characterized by a predetermined equipment protocol for interfacing with a handset, of compatible design, so that a telephony device can communicate through such system. In accordance with such method, the state of the logic bus is observed. The protocol of the transceiver is then identified. The status of the device is next observed. Thereafter, at least one signal for controlling the operation of the device is generated in accordance with the state of the bus and the status of the device. Further, information is transmitted onto the bus in response to the status of the device in the protocol of the transceiver.

The preceeding and other features and advantages of the invention will become further apparent from the detailed description that follows. This description is accompanied by a set of drawing figures. Numerals are employed throughout the written description and the drawings to point out the various features of this invention, like numerals referring to like features throughout.

DETAILED DESCRIPTION

Figure 1:
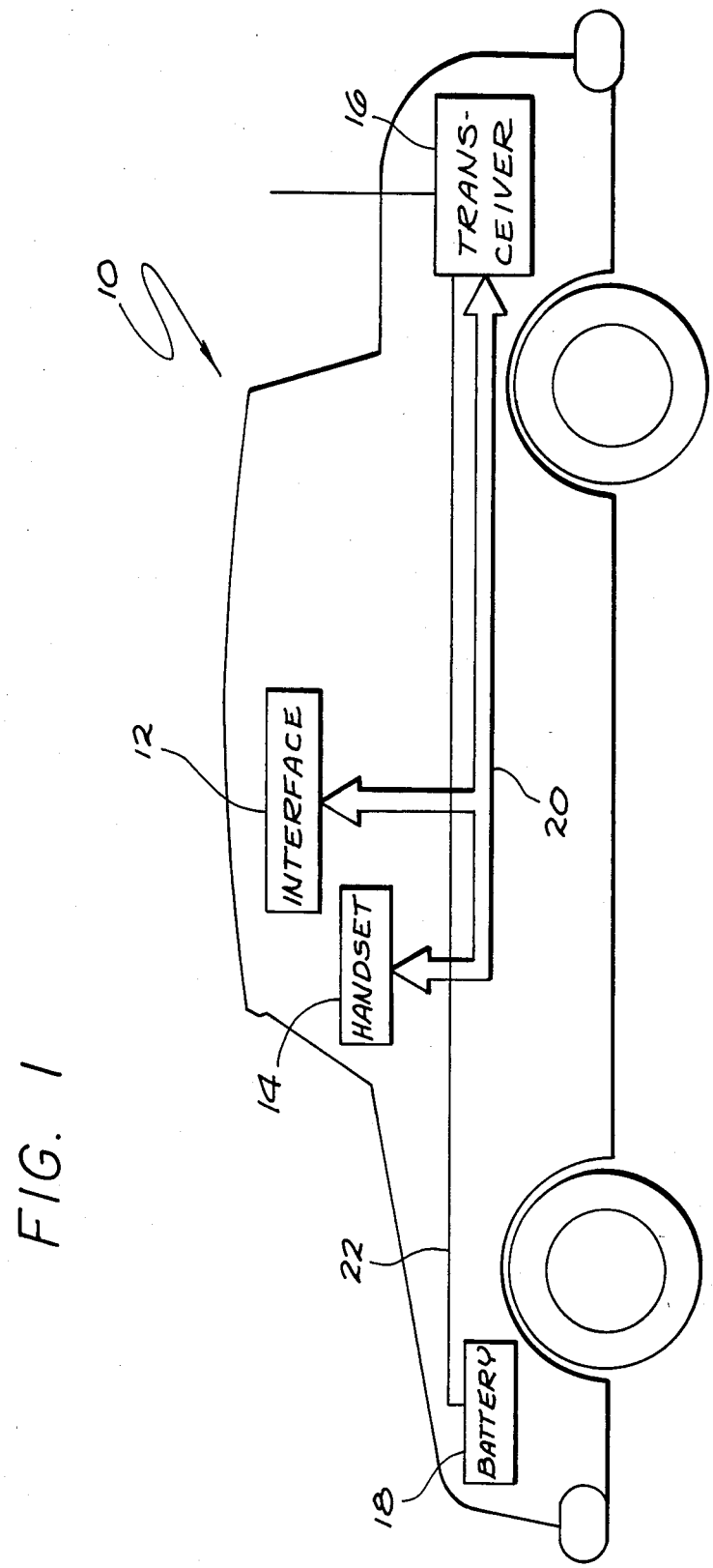
FIG. 1 is a diagram of mobile vehicular equipment including an interface unit in accordance with the invention.
Figure 2A:
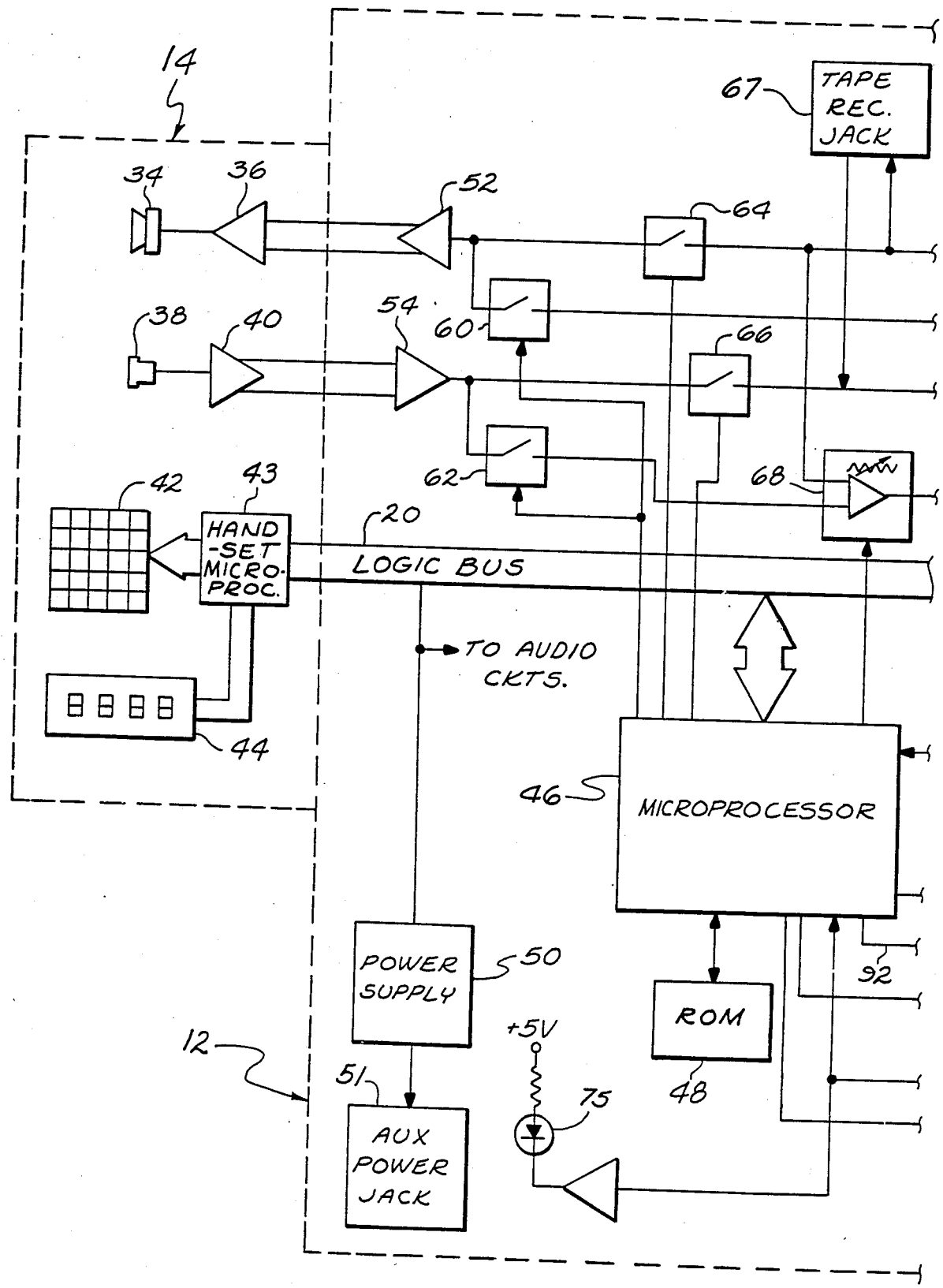
FIG. 2 is a schematic diagram of the interface of the invention.
Figure 2B:
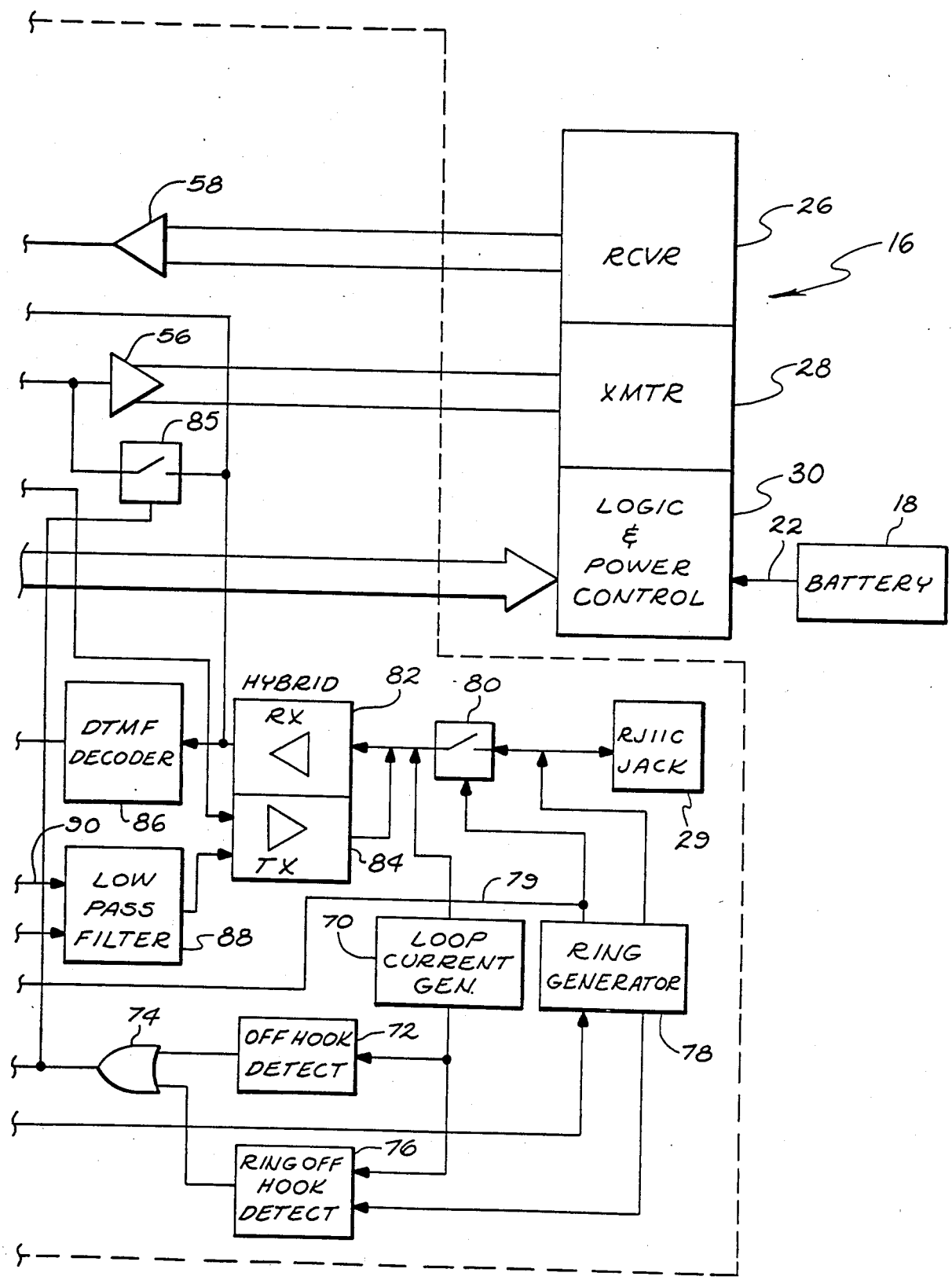

Turning now to the drawings, FIG. 1 is a diagram of a mobile vehicular unit for a conventional cellular system. The vehicular unit, adapted to be mounted in an automobile 10, includes an interface 12 in accordance with the invention. A cellular handset 14 provides for user input (signalling and audio) that is communicated through a vehicle-mounted radio transceiver 16. Logic and power (originating with the vehicle battery 18) is transmitted between the transceiver 16, the interface 12 and the handset 14 through a transceiver bus 20. A cable 22 delivers power from the battery 18 to a logic and power control section of the transceiver 16 (discussed below). FIG. 2 is a schematic diagram of the interface 12 of the invention. The interface as illustrated interacts with a cellular handset 14 and transceiver 16. The audio interface is typically 600 ohm balanced. However, it is to be appreciated that the interface is also compatible with single-ended unbalanced systems.

The transceiver 16 includes three primary functional units. A receiver section 26 transmits signalling and audio received from the cell site transmitter. A transmitter section 28 accepts audio and signalling that originate from either the handset 14, a standard telephone or modem plugged into the telephone outlet 29, such as a RJ11C (Universal Service Order Code for standard mini-modular) jack, of the interface 12, or both and, upon command, transmits to the cell site receiver. A logic and power control module 30 "talks" to the handset 14 and to the interface 12 over the transceiver bus 20.

The arrangement of a standard cellular handset 14 includes a speaker 34 or other conventional audio output device and an input differential receiver 36 in communication therewith. A microphone 38, in combination with a differential driver 40, is provided for the user's audio input. A standard cellular keypad 42 is provided for input to a handset microprocessor 43. Various functions, both incoming and outgoing, are illustrated on a display panel 44.

Figures 4A, 4B:
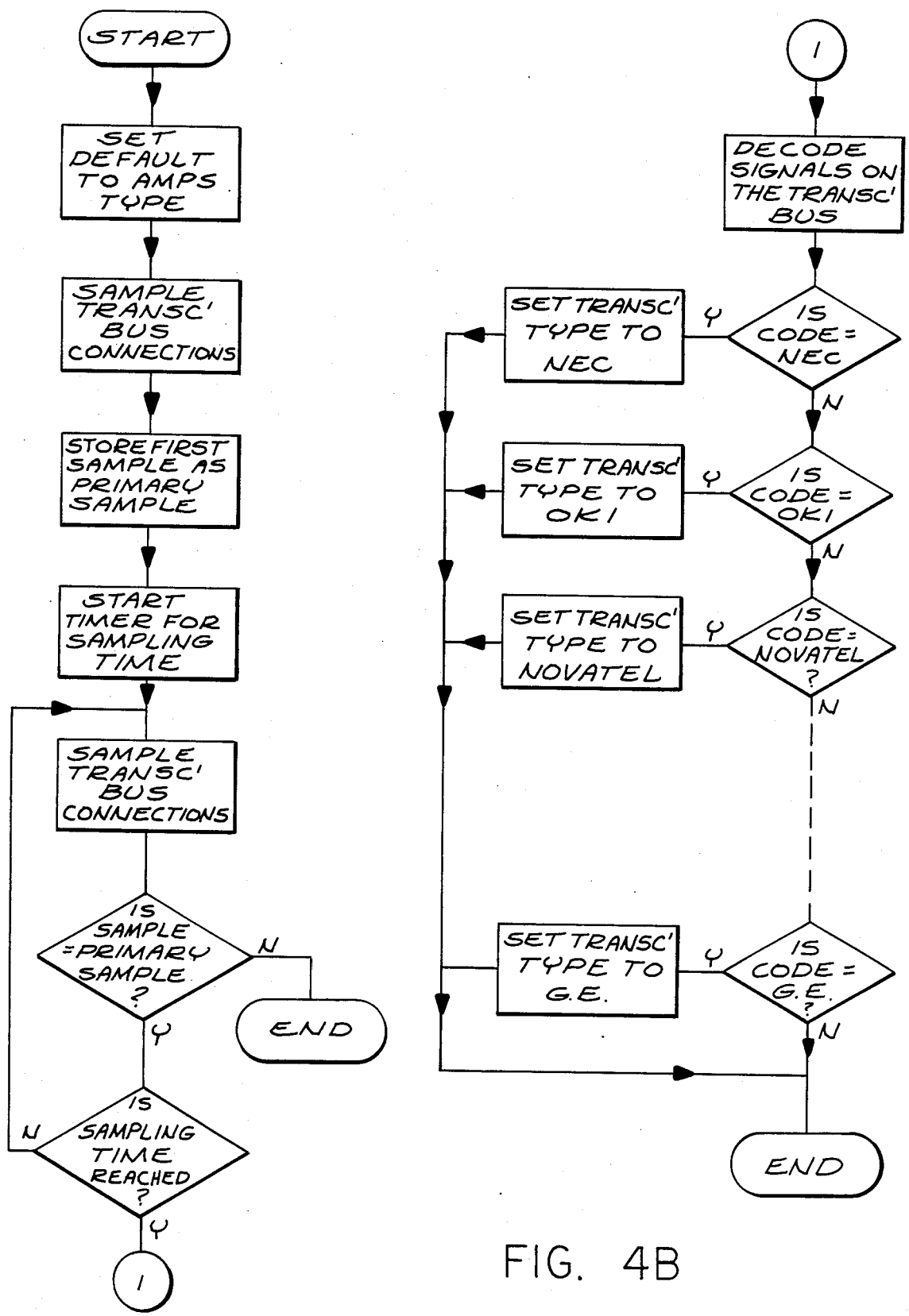
FIGS. 4A and 4B comprise a flow chart of an algorithm for detecting transceiver protocol in accordance with this invention.

The heart of the interface is an eight-bit microprocessor 46 that is programmed to control various essential interface functions. A system read only memory (ROM) 48 stores system data. By providing a memory for data storage, the invention is able to function as illustrated herein regardless of the manufacturer operating protocol of the handset-and-transceiver system. The utility of this feature of the invention resides in the fact that, whereas as single protocol, known by the acronym of "A.M.P.S." (Advance Mobile Phone Service) once served as the industry standard, a number of equipment manufacturers have since adopted different protocols for handset-to-transceiver communication. In large measure, this charge has reflected a desire to simplify the hardware requirements. A.M.P.S., a parallel system, requires the dedication of eight pin connections while serial systems typically require only three pin connections. Examples of other equipment protocols currently in use include the serial protocols of the NEC, the OKI, the General Electric and the Novatel transceivers. In the present invention, known equipment protocols are detected at the microprocessor through systematic comparison with the known protocols that are stored in the system ROM 48. As the transceiver protocol is analyzed and determined by the interface (upon installation) the microprocessor 46 is prepared to transmit and receive communications in the proper system protocol. Thus the present invention, by incorporating an intelligent microprocessor, is rendered compatible with known transceiver types. A representative algorithm for detecting transceiver protocol in accordance with this invention is illustrated by the flow chart that comprises, in combination, FIGS. 4A and 4B of the drawings.

The audio circuits of the interface 12 are powered directly by 12 volt d.c. from the automobile battery 18 while a voltage regulator 50 converts the battery voltage to 5 volts d.c. for supply to the interface logic circuits. An auxiliary power jack 51 is provided for powering a lap computer of like apparatus. The audio circuits include a differential driver 52 and a differential receiver 54 that provide a port for communicating with the handset 14 while a differential driver 56 and a differential receiver 58 form a transceiver port. Intercom capability is afforded by the intercom switches 60 and 62, each under microprocessor control, that permit handset communication with the telephone device, such as a home or office telephone that is connected to the outlet 29 of the interface. The presence of this capability permits conference communication with the cell site receiver/transmitter. Alternatively, this feature permits communication between the handset 14 and the device, an especially desirable feature in the event that a cordless telephone is plugged into the outlet 29.

The audio path between the handset 14 and the transceiver is further controlled by microprocessor-controlled audio switches 64 and 66. These switches are normally (i.e., when no apparatus is plugged into the outlet 29) closed to permit normal usage when desired. Otherwise, when interrogation of the outlet 29 determines that a device is in communication therewith, the switches are moved to their open positions. A jack 67 is provided for attachment of a tape recorder of any of a number of "hands free" audio input devices.

A variable gain amplifier 68 is located in the interface receiver channel. The amplifier 68 is controlled by the microprocessor 46 to adjust the volume of the incoming transmission, as desired. The input from the telephony device for commanding a volume adjustment comprises a recognizable coded transmission during the audio phase of a transmission such as the application of a code using the buttons of a touch tone telephone or the dialing of a predetermined code of a pulse (i.e. rotary) dial telephone.

Referring now to the signalling section of the interface face 12, a loop current generator 70 comprises electrical current sinking circuit that includes the telephone outlet 29. When the telephony device that is plugged into the outlet 29 is taken off the hook, the outlet changes from an open to a closed circuit, thereby causing current to flow from the 12 volt power supply through the outlet and device to ground.

A off hook detect electrical circuit 72 is in electrical connection with the loop current generator 70. The electrical potential of a preselected node of the circuit 72 changes from 12 volts to ground as a consequence of a current flow in the loop current generator 70. This grounding of the node effects a change in the state of the output of the hook detect from "low" to "high"The design of circuitry for effecting a detectable change in the state of the output of the circuit 72 in response to a change in the status ("on" or "off" hook) of the device plugged into the outlet 29 is understood to be well known in the circuit design art.

The output of the circuit 72 is directed to an input of an OR gate 74, the other input of which comes from a ring off hook detector circuit 76. The ring off hook detector circuit 76 is discussed below. Essentially, this circuit serves to inform the interface, in the midst of a ring burst of a ring generator 78, that the telephony device has been picked up. The interface, of course, moves to a new mode of operation when the device plugged into the outlet 29 is picked up either to initiate a call or to answer a call. By ORing together these outputs, the system provides similar effects regardless of the phase of operation of the device at the time the receiver is picked up.

The output of the OR gate 74 is applied to (1) an amplifier 80 and a light emitting diode (LED) 75 that provides a visual confirmation to the user that the telephony device is off hook, (2) the microprocessor 46 for processing as discussed in conjunction with the following figure and (3) an interface audio switch 85 that closes in response to the state of the gate 74 to permit transmission of audio from the device to the differential driver 56 of the transceiver output section of the interface. It should be noted that the differential receiver 58 of the transceiver output section of the interface is always on line to the device plugged into the outlet 29.

The ring generator 78 is activated by the microprocessor 46 that is, in turn, responsive to the presence of incoming call signalling on the transceiver bus 20. In response to such signalling, the microprocessor 46 transmits a 5 volt 20 Hz (ringing frequency) square wave to the generator 78. Circuitry of the ring generator 78 first amplifies this signal to a 12 volt amplitude then increases this signal to a 60-to-80 volts r.m.s. a.c. waveform (by means of a step-up transformer) for actuating the ringing mechanism of the standard dial or touch tone telephone that may be plugged into the outlet 29.

At the same time that it generated the above-referenced square wave, the microprocessor 46 transmits a signal on the conductor 79 that causes a ring relay switch 80 to open. This normally-closed switch connects hybrid audio duplexer circuits, including a receiver circuit 82 and a transmitter circuit 84 to both logic and audio circuits of the interface 12. The opening of this switch during the ringing function protects such circuitry from the 168 peak-to-peak voltage of the ring generator 78.

The receiver audio hybrid circuit 82 accepts audio from the handset 14 through the intercom switch 60 (when the switch 60 is enabled by transmission of the appropriate code from the telephony device) and passes dialing tones generated by the telephony device that is plugged into the outlet 29 to a decoder 86. The decoder is preferably an integrated circuit of the DTMF (for dual tone multi-frequency) type that converts incoming frequencies into hexidecimal words. The decoded tones are fed to the microprocessor 46 as set forth in greater detail with reference to the following figure.

The transmitter audio hybrid circuit 84 accepts a sinusoidal dial tone from a low pass filter and mixer 88 that is provided when the off hook condition, without incoming signalling, is detected by the microprocessor 46. This sinusoid is directed through the circuit 86 to the outlet 29 so that the user of the device attached thereto receives exactly the same response when taking the telephone off the hook as he would in a non-mobile system. The sinusoid is generated from a pair of square waves applied to the filter and mixer 88 over the conductors 90 and 92. These square waves are generated in the microprocessor 46 at the frequencies of 350 Hz and 440 Hz, well known and recognized in the telephone communication arts as "precision frequencies" for dial tone generation.

Figure 3A:
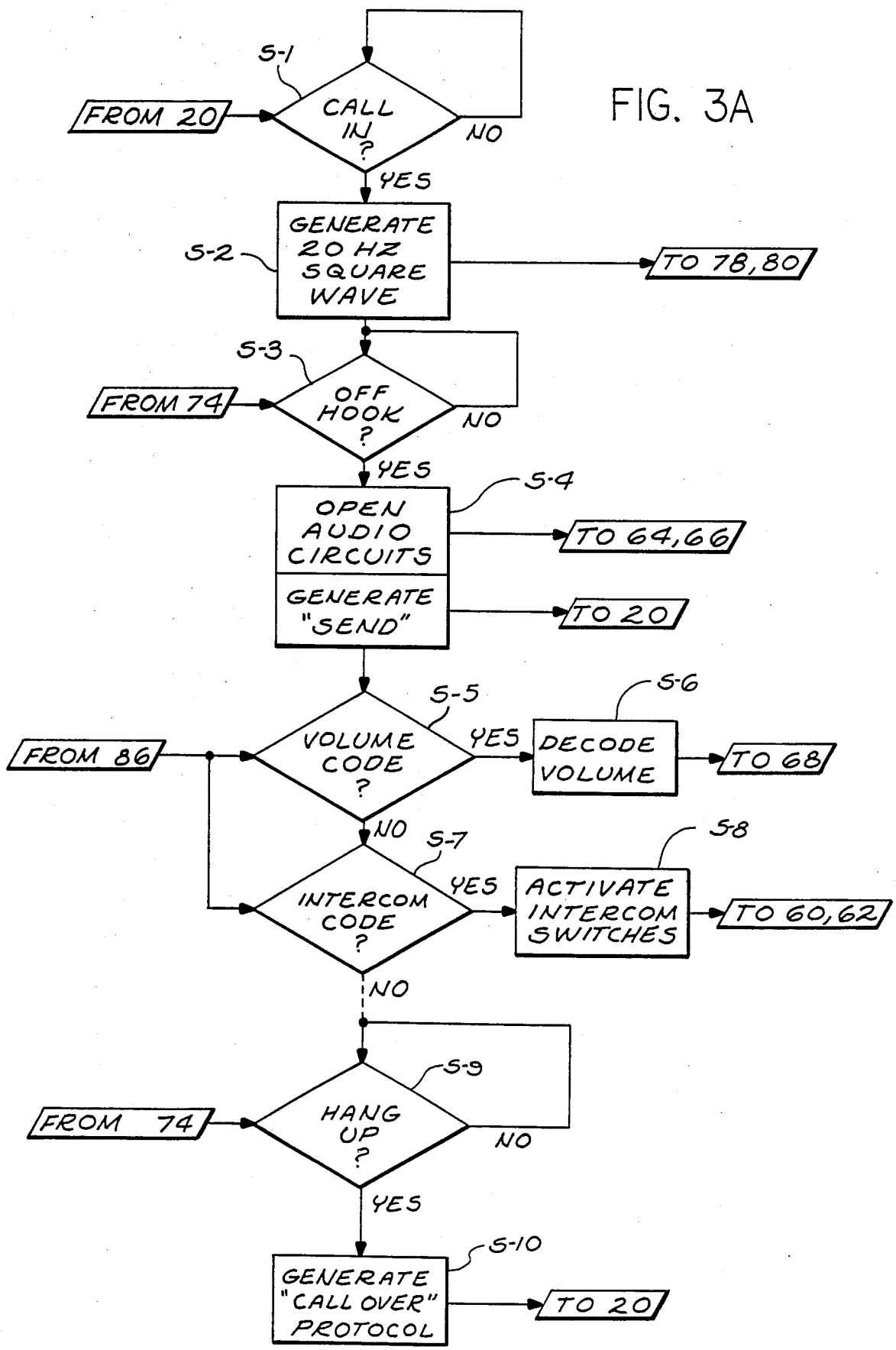
FIGS. 3A and 3B are flow diagrams of the microprocessor control functions of the invention in response to an external transmission and an internally-generated transmission, respectively.
Figure 3B:
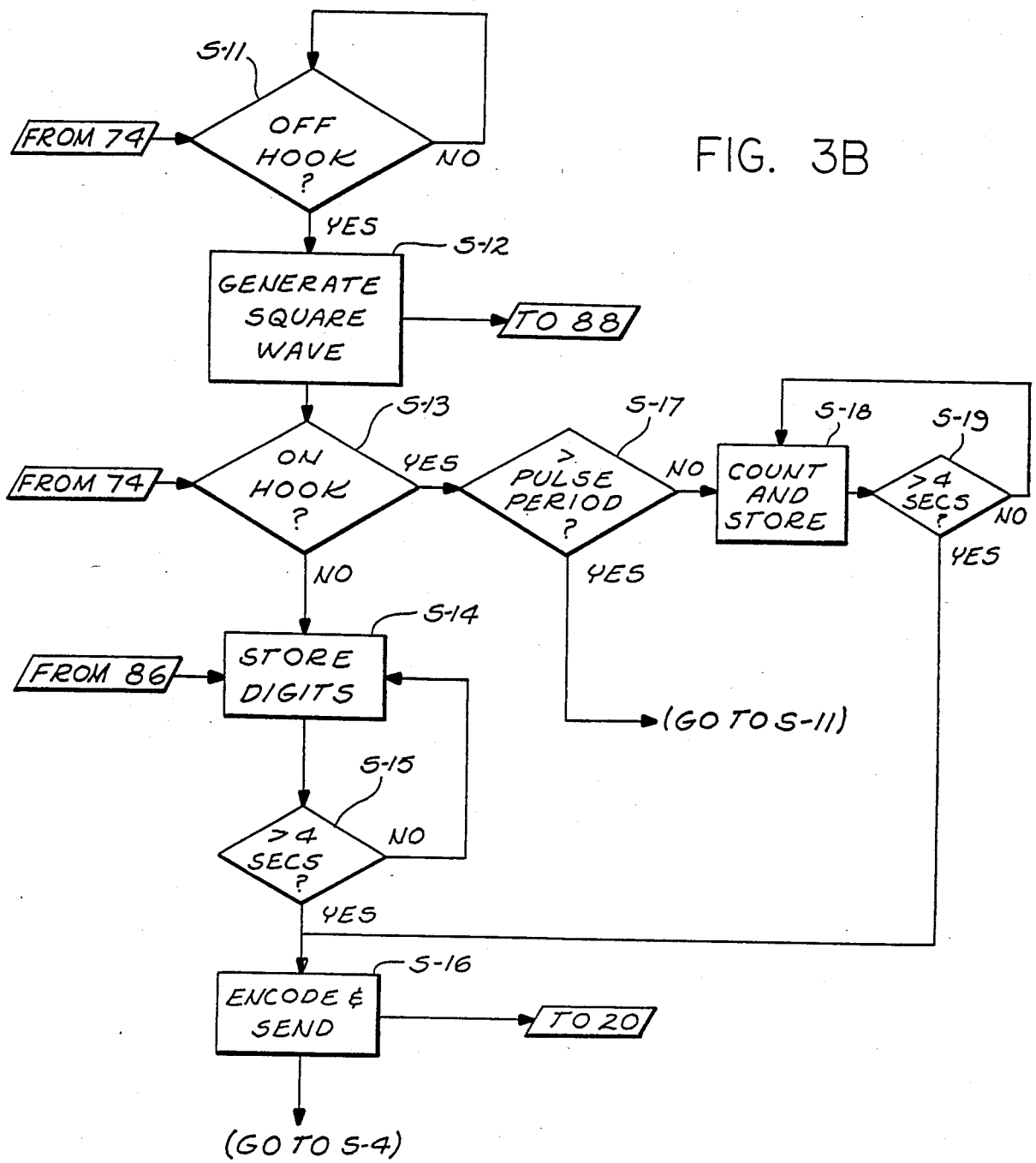

The operation of the interface will become further apparent from the control operations of the microprocessor 46 that are set forth in the flow diagrams of FIGS. 3A and 3B. FIG. 3A sets forth the operation of the microprocessor 46 in response to a transmission from a telephone unit outside the mobile vehicular unit comprising the transceiver 16, the device that is plugged into the outlet 29 fo the interface 12 and the handset 14. Figure 3B depicts the operation of the microprocessor 46 as initiated by the operator of the device plugged into the outlet 29 of the interface 12.

Referring now to the flow chart of FIG. 3A, the microprocessor 46, having identified the operating protocol of the transceiver 16, continuously interrogates the transceiver bus 20 for the appropriate code indicating an incoming call (step S-1). When this code is detected, the microprocessor generates a 20 Hz square wave (step S-2) and transmits this signal to the ring generator 78 and an "open circuit" signal to the ring relay 80. As mentioned above, the ring generator 78 includes an amplifier and a step-up transformer for increasing the voltage of this signal from 5 volts to 60 volts r.m.s. As explained, the ring relay 80 protects the remaining circuitry of the interface 12 during the ringing of the device by opening the connection of the audio circuits to the outlet 29 during ringing.

After the ringing of the device has been actuated, the microprocessor 46 interrogates the appropriate port for the status of the output of the OR gate 74 (step S-3). The output of the gate 74 is responsive to the detection of an "off hook" condition. When such a condition is detected, the microprocessor ceases to transmit the 20 Hz square wave and the ringing of the device ends in the same manner as does that of a telephone connected to a conventional wired system.

Once the device has gone off hook, the microprocessor 46 opens the audio switches 64 and 66. It should be noted at this point that the switches are generally closed and will remain closed if an off hook condition is not detected. This permits handset-to-transceiver communication in the event a device is not connected to the outlet 29 or the user chooses to use the handset rather than the device. The subsequent removal of the device from the hook will disconnect the handset unless an intercom mode is chosen.

At the same time the microprocessor 46 detects an off hook condition, the signal at the output of the OR gate 74 causes the interface audio switch 85 to close, connecting the receiver audio hybrid circuit 82 to the transmitter section 28 of the transceiver. As mentioned, the receiver section 26 of the transceiver is continually connected to the transmitter audio hybrid circuit 84. Thus, full duplex communication is established with the device plugged into the outlet 29.

The microprocessor outputs a "send" signal, properly coded in the transceiver protocol, over the transceiver bus 20 whereby the transceiver is energized for for full duplex audio transmission at the same time the audio circuits are opened (step S-4). A number of user options, though not all, are indicated in steps S-5 through S-8. Numerous features are made available via the capacity of the microprocessor 46 to decode tones from the DTMF decoder or pulses from the off hook detector. The microprocessor 46 is able to accept data at a very high rate from the decoder chip 86 and from the off hook detector 72, acting as a buffer so that signalling data is sent to the transceiver 16 at an acceptable rate. In this manner, the interface 12 is able to accommodate the various "fast dialing/redialing" options currently offered for telecommunications systems.

As indicated at step S-5, the user may choose to increase or decrease the volume of the incoming audio by either rotary or touch tone dialing or by entering a code on the touch tone telephone. In accordance with the system mode in operation (independent of the protocol of the equipment with which the device is being interfaced). the microprocessor will decode the volume command (step S-6) and adjust the variable gain amplifier 68. A second indicated option, that of intercom with the handset 14, is similarly activated by signalling to the microprocessor 46 (step S-7) whereby the microprocessor is caused to closed the intercom switches 60 and 62 (step S-8). Other options that may be similarly actuated by the transmission of a coded input from the device connected to the outlet 29 (a representative user code for this purpose would be a five digit transmission beginning "000" followed by a two-digit command) might include a "self test" in which the dialed signal is observed on the handset display 44 prior to the transmission of a coded send signal by the microprocessor 46, a "ring check" to determine whether the ringer of the device is operational and the like. All of such options are made feasible by the incorporation of a microprocessor into the interface 12.

The period of full duplex audio transmission is indicated by the vertical dashed line of FIG. 3A. The microprocessor continues to interrogate the pin connected to the output of the OR gate 74 during audio transmission for the "hang up" mode. Once this occurs (step S-9), the microprocessor 46 generates and outputs the appropriate "end of call" protocol over the transceiver bus 20 (step S-10) whereby the transceiver perform the appropriate functions such as power down, etc.

FIG. 3B illustrates the microprocessor routine that occurs when a call is initiated at the device that is plugged into the outlet 29. Steps S-11 through S-19 of FIG. 3B replace steps S-1 through S-3 of FIG. 3A.

As in step S-1 of the prior flow chart, the microprocessor continually interrogates the state of the output of the Or gate 74 to determine whether the device is off hook (step S-11). When this occurs, the microprocessor 46 generates a pair of square waves, one at 350 Hz and the other at 440 Hz, the precision frequencies for generating a standard telephone dial tone. As mentioned earlier, these signals are applied to the low pass filter and mixer 88 by means of the conductors 90 and 92 (step S-12).

Once the microprocessor has generated the signals for providing the caller a dial tone, it prepares to accept the dialing. While tone dialing will be seen to be processed through the DTMF decoder 86, pulsed dialing signals, such as those generated by a standard rotary telephone, are transmitted through the off hook detector circuit 72.

The microprocessor, after transmitting the dial tone-generating square waves, examines the output state of the OR gate 74 (step S-13). In the event that the user is presently in the process of generating tone dialing signals, the device will remain off hook and the microprocessor processor proceeds to step S1-14. In the event that the user has either decided to terminate or is in the process of dialing with a pulse dialing apparatus, such as a rotary telephone, the microprocessor proceeds to steps S-17 through S-19, a routine that is discussed below.

Assuming that the receiver has remained off hook, the microprocessor 46 receives the dialing tones as hexadecimal-encoded words, in parallel form (4 bit words), from the decoder 86. Each such word is stored (step S-14). The microprocessor continues to store such information provided a fixed increment of time is not exceeded between receipt of the hexadecimal words. A preferred time increment for ascertaining the completion of a dialing sequence is four (4) seconds. When this time increment is exceeded (step S-15), the microprocessor encodes the dialing sequence in accordance with the transceiver protocol whereby this signalling is transmitted over the transmitter section 28 of the transceiver 16. Once the completion of a circuit is indicated on the transceiver bus 20, the system proceeds to the steps indicated in steps S-4 through S-10 of FIG. 3A.

When the state OR gate 74 indicates to the microprocessor that the telephony device has returned to the on hook position (step S-13), the microprocessor then examines the period of time that it remains on hook. A preselected time is programmed into the routine which corresponds to the period of a dialing pulse. Such pulses are generally of about 100 millisecond duration. In the event that the device should return to the off hook position within this time frame, the input from the OR gate 74 is pulsed dialing. If this time period is exceeded, the microprocessor determines that the caller has decided to abort the call prior to dialing.

Upon examination of duration of the on hook period at step S-17, the microprocessor returns to step S-11 to look for the user to begin another call when the dialing pulse period is found to have been exceeded. In the event that the dialing pulse period was not exceeded, the microprocessor proceeds to a standard routine for counting and storing dialing pulses (step S-18). As in the case of tone dialing, the microprocessor waits after the input of each pulse dialing input to ascertain the end of dialing (step S-19). When a set period of time is exceeded, the routine proceeds to the previously-discussed series of steps that begin with step S-16 of this figure.

In the event that the device plugged into the outlet 29 goes off hook when the vehicle is in a "no service" area, the interface will generate a signal identical to the "fast busy" generated by a central office to indicate that all trucks are occupied. The low or no signal condition is transmitted over the bus 20. When the off hook is detected thereafter, the microprocessor 46 generates and transmits square waves of 480 and 620 Hz (the appropriate frequencies for generating a precision fast busy signal) over the conductors 90 and 92. The low pass filter and mixer 88 will process these signals so that this well recognized audio signal is generated by processing at the hybrid audio circuits 84 and 82 and transmitted to the device plugged into the outlet 29.

Thus it is seen that the present invention provides new and useful apparatus for enhancing the utility of existing cellular communication systems. By applying the teachings of this invention, one is able to incorporate familiar telephony devices and to operate such devices in thoroughly familiar modes while accessing cellular radio communication systems. In this manner, the usefulness of such systems is enhanced. By providing a microprocessor-controlled system, the user is able to obtain an interface that is universally compatible with existing cellular transceivers and handsets.

While this invention has been described with reference to a presently preferred embodiment, its scope is not so limited. Rather, this scope of this invention is limited only insofar as defined by the following set of claims and all equivalents thereof.

What is claimed is:

1. Apparatus for interfacing a standard telephone outlet with a cellular system, said cellular system being characterized by a radio transceiver adapted to communicate directly with a handset of compatible design so that audio is transmitted between said handset and a central office, said apparatus comprising, in combination:
  (a) means for observing the state of the logic bus of said transceiver;
  (b) means for observing the status of said outlet;
  (c) means for generating at least one signal for controlling said outlet in response to the state of said logic bus of said transceiver and the status of said outlet; and
  (d) means including a microprocessor in communication with said logic bus of said transceiver and with said outlet, said means being arranged to identify the protocol of said transceiver and to communicate the state of said outlet in said identified protocol to said logic bus.

2. Apparatus as defined in claim 1 further including:
  (a) a plurality of switches interposed between said transceiver and said handset; and
  (b) said switches are controlled by said microprocessor.

3. Apparatus as defined in claim 2 further including means in electrical connection with said outlet for detecting an off hook status at said outlet and for transmitting a predetermined signal to said microprocessor in response thereto.

4. Apparatus as defined in claim 3 further including means for providing a high voltage signal to said outlet in response to a predetermined signal input from said microprocessor.

5. Apparatus as defined in claim 1 further including means in electrical connection with said microprocessor for providing precision telephone signals to said outlet in response to square wave inputs therefrom.

6. Apparatus as defined in claim 5 further including means in electrical connection with said outlet for decoding both pulse and tone signalling inputs therefrom.

7. A method for modifying a cellular system of the type that includes a transceiver haracterized by a predetermined equipment protocol for interfacing with a handset of compatible design so that a telephony device can communicate through said system, said method comprising the steps of:
  (a) observing the state of the logic bus of said transceiver; then
  (b) identifying the protocol of said transceiver; then
  (c) observing the status of said device; then
  (d) generating at least one signal for controlling its operation in response to the observed status of said logic bus and the observed state of said device; and
  (e) transmitting information onto said bus in response to the status of said device in the protocol of said transceiver.

8. A method as defined in claim 7 further including the step of controlling the communication links between said handset and said transceiver in accordance with the status of said device.

9. A method as defined in claim 8 further including the steps of:
  (a) detecting the off hook condition of said device; then
  (b) generating a precision dial tone signal in response to said off hook condition; and then
  (c) transmitting said precision dial tone signal to said device.

10. A method as defined in claim 8 further including the steps of:
  (a) decoding the incoming call state of said bus; then
  (b) generating a high voltage signal for activating a ringer; and
  (c) transmitting said signal to said device.

11. A method as defined in claim 8 further including the steps of:
  (a) decoding the no service state of said bus; then
  (b) generating a precision fast busy signal; and
  (c) transmitting said signal to said device.

12. A method as defined in claim 7 wherein the step of observing the status of said device is further characterized by the step of decoding at least one tone signal.

13. A method as defined in claim 7 wherein the step of observing the status of said device is further characterized by the step of decoding at least one pulse coded signal.

* * * * *